United States Patent [19]
Consoli

[11] 3,937,917
[45] Feb. 10, 1976

[54] METHOD FOR PRODUCING AND HEATING A PLASMA

[75] Inventor: Terenzio Consoli, Meylan, France

[73] Assignee: Commissariat a l'Energie Atomique, Paris, France

[22] Filed: Feb. 22, 1973

[21] Appl. No.: 334,897

[30] Foreign Application Priority Data
Mar. 6, 1972  France .............................. 72.07756

[52] U.S. Cl. .......... 219/121 P; 176/1; 219/10.55 R;
219/121 LM
[51] Int. Cl.² ...................... B21B 1/00; H05B 7/00
[58] Field of Search...... 219/121 P, 10.55 R, 121 L, 219/121 LM, 76; 176/1, 3

[56] References Cited
UNITED STATES PATENTS
3,733,248   5/1973   Hendel et al. .......................... 176/1
3,778,343   12/1973  Coppi et al. .......................... 176/3
3,779,864   12/1973  Kaw et al. ............................. 176/1

Primary Examiner—Bruce A. Reynolds
Attorney, Agent, or Firm—Flynn & Frishauf

[57]              ABSTRACT

Microwave-frequency electromagnetic energy is stored in a superconducting resonant structure. The non-ionized solid material from which the plasma is to be obtained is placed within said structure and this latter is excited by a generator of the klystron type. When the stored energy attains maximum value, pre-ionization is initiated by means such as a solid-state laser associated with an optical system in order to create an absorbent load into which the energy is discharged.

8 Claims, 5 Drawing Figures

METHOD FOR PRODUCING AND HEATING A PLASMA

This invention relates to a method of production and heating of a plasma and to a device for carrying the method into effect. The invention finds an application especially in plasma physics when it is desired to produce dense and hot plasmas and more especially in the study of controlled thermonuclear fusion.

The creation and heating of a plasma entail the need for very high levels of instantaneous excitation power. At the present time, there are three known types of sources for producing power outputs of this order: intense electron beams, capacitor banks and finally solid-state lasers. Although the techniques associated with these different types of generators have led to considerable technological advances in the field of plasma heating, such techniques are subject in the final analysis to limitations which prevent them from achieving the high-power requirements of certain applications such as controlled thermonuclear fusion. So far as intense electron beams are concerned, for example, the limitation at the present time arises primarily from the fact that the available energy remains insufficient whereas, in the case of capacitor banks, the limitation lies in the difficulty involved in obtaining high spatial density of excitation energy. The devices which make use of solid-state lasers have recently made it possible to overcome the disadvantages attached to the first two methods but a further limitation has become apparent in regard to the value of the emission energy which remains lowewr than about one thousand joules for reasons relating to the resistance of active materials which constitute the rods. Moreover, this method makes use of an exciting wave having a very high frequency ($10^{14}$ to $10^{15}$ cps), which limits the duration of the interaction between the exciting wave and the plasma by reason of the fact that, during its expansion, the charge density within the created plasma drops very rapidly below the cut-off density which corresponds to the high frequency of the light wave.

SUMMARY OF THE INVENTION

The method according to the invention and the device for the application of said method make it possible on the contrary to attain performances beyond the limits encountered by methods of the prior art. In point of fact, the invention consists in adopting a lower microwave frequency as means for producing and heating the plasma, which results in a longer and more effective wave-plasma interaction, and in adopting as energy source a superconducting resonator which is initially charged by said microwave and subsequently discharged in a very short period of time.

More precisely, the present invention is directed to a method for producing and heating a plasma which is characterized in that:

in a first step, a microwave-frequency electromagnetic energy is stored in a superconducting resonant structure and the non-ionized solid material from which the plasma is to be obtained is placed within said structure and, in a second step, said material is pre-ionized in order to create an absorbent load into which the previously-stored electromagnetic energy is discharged.

A device for carrying out the aforesaid method comprises:

a superconducting structure which is resonant at microwave frequencies and in which said solid material is located, means for supplying said structure with a microwave-frequency electromagnetic field and, means for initiating pre-ionization of the material from which the plasma is to be obtained.

BRIEF DESCRIPTION OF THE DRAWINGS

The characteristic features and advantages of the invention will be more clearly brought out by the following description in which a number of embodiments are given by way of explanation without any limitation being implied, reference being made to the accompanying drawings, wherein.

DETAILED DESCRIPTION OF THE DRAWINGS

Figure 1:
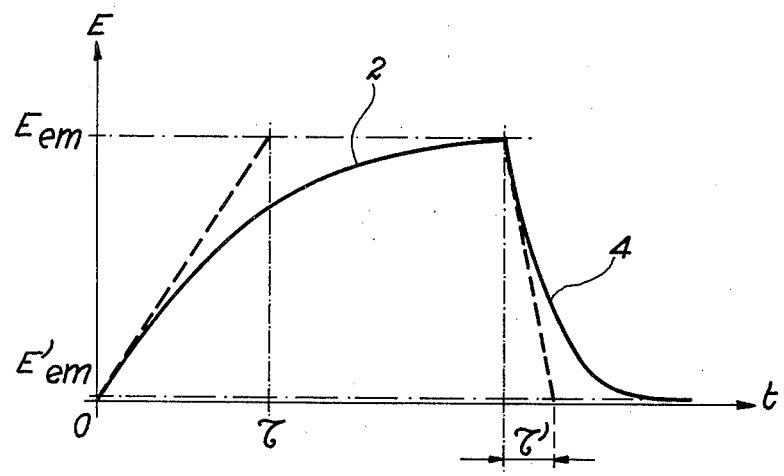
FIG. 1 represents a theoretical curve of charge and discharge of a resonant cavity.

In order to gain a clearer understanding of the method according to the invention, a few properties of microwave resonant cavities will first be recalled. In a cavity of this type, the two main characteristics which play a part in the operation of the device according to the invention are its resonant angular frequency $\omega$ and its quality factor or Q. By definition, the unloaded Q of a cavity is given by $$Q = 2\pi (E_{em}/W_c) \quad (1)$$

wherein $E_{em}$ is the energy stored in the cavity and $W_c$ is the energy lost per cycle within said cavity. If the right-hand side of the relation is multiplied at the top and bottom by the resonant frequency, the following equivalent expression is readily obtained:

$$Q = \omega (E_{em}/P_{dis}) \quad (2)$$

where $P_{dis}$ is the power dissipated within the cavity. This expression serves to compute on the basis of the characteristics Q and $\omega$ the stored energy $E_{em}$ as a function of the dissipated power $P_{dis}$:

$$E_{em} = P_{dis} (Q/\omega) \quad (3)$$

When the resonant cavity is charged by a generator which delivers a power $P_g$, equilibrium is attained when the power dissipated in the cavity is equal to the power delivered by the generator. The maximum energy stored in the cavity is accordingly given by the formula:

$$E_{em} = P_g (Q/\omega) \quad (4)$$

The above formula gives total stored energy which is attained when the cavity charging step has been completed, that is to say when steady-state operation has been attained. So far as the transient cavity-charging step is concerned, it is readily established that the progressive variation of the energy $E$ contained within the cavity is an exponential function of time of the form:

$$E = E_{em} (1 - e^{-t/\tau}) \text{ with } \tau = (Q/\omega) \quad (5)$$

This formula shows that the energy stored within the cavity increases continuously but tends towards a limit $E_{em}$ as given by formula 4.

The reverse problem of discharging a cavity having a quality factor Q in which electromagnetic energy $E_{em}$ has previously been stored, at a frequency $\omega$, is dealt with in a similar manner and results in a variation which is also exponential and of the form:

$$E = E_{em} e^{-t/\tau})  \quad (6)$$

A decrease in energy takes place with the same time constant as that which characterizes the increase in energy in the charging problem.

The formulae given in the foregoing show that the time constant of increase in the energy stored varies as the quality factor $Q$ of the cavity. Let it accordingly be assumed that a resonant cavity has been charged with a microwave electromagnetic energy $E_{em}$ and the quality factor of the cavity is subjected to an abrupt variation. To this end, the cavity can be coupled with an external load circuit or charged by means of an internal device. Accordingly, it is known that the new quality factor referred to as the loaded $Q$ and having the notation $Q_c$ is expressed as a function of the initial or so-called unloaded quality factor having the notation $Q$ and of the quality factor which characterizes the load and has the notation $Q_e$, by the following relation:

$$1/Q_c = (1/Q) + (1/Q_e) \quad (7)$$

When the quality factor changes abruptly from the value $Q$ to the value $Q_c$, the cavity is then in a state of unbalance since the new permanent state corresponds to a stored energy $E'_{em} = P_g (Q_c/\omega)$ which is different and lower than the energy $E_{em}$. Accordingly, it can readily be demonstrated that the cavity tends towards its new state of equilibrium by following a law of exponential decrease of the form: $E = E'_{em} + (E_{em} - E'_{em}) e^{-t/\tau'}$ with $\tau' = Q_c/\omega$) (8)

If the loaded Q is considerably lower than the unloaded Q as in the case according to the invention, it is possible to disregard $E'_{em}$ compared with $E_{em}$ and to write:

$$E \simeq E_{em} e^{-t/\tau'} \quad (9)$$

The decrease in energy E which arises from absorption in the load takes place with a time constant $\tau'$ which is very considerably smaller than the time constant $\tau$ of increase.

The different steps involved in charging and discharging a resonant cavity as mentioned in the foregoing are illustrated in FIG. 1. In this figure, the time $t$ is plotted as the abscissa and the instantaneous energy $E$ stored in the cavity is plotted as the ordinate. It is postulated that, at the instant $t = 0$, a power generator $P_g$ excites the cavity, the quality factor of which is Q in the resonance mode which is selected.

The energy E increases within the cavity in accordance with a law which corresponds to relation (5) and tends toward a limit $E_{em}$ as given as given by relation (4). This is represented by the portion of curve 2 of FIG. 1. The slope at the origin of the curve of increase is equal to $E_{em}/\tau$ and the point of intersection of the tangent at the origin with the straight line of ordinate value $E_{em}$ has as the abscissa the instant $\tau$ which is the loading time constant of the resonator. If the resonant cavity and the generator were isolated at a subsequent instant, which would amount to putting $P_g = 0$, there would accordingly be observed a drop in the stored energy E in accordance with law (6) and this would take place with the same time constant $\tau$ as that of the charging step. Let it be assumed on the contrary and in accordance with the invention that the generator remains connected to the resonant cavity and that the quality factor of this latter is abruptly modified in order to cause a transition from the value Q to the value $Q_c$. The energy E decreases sharply from the initial value $E_{em}$ to the final value $E'_{em}$. This partial discharge of the cavity takes place in accordance with the exponential law (8) with the time constant $\tau' = Q_c/\omega$. This is represented by the portion of curve 4 in FIG. 1.

During this discharge step, the power P which is dissipated in the load is approximately equal to:

$$P \simeq E_{em}/\tau' = P_g (\tau/\tau') = P_g (Q/Q_c) \quad (10)$$

In consequence, the power collected and the power of the generator are in the same ratio as the unloaded and loaded quality factors of the resonator.

If the excitation generator were disconnected at the same instant as the abrupt changeover from the value $Q$ to the value $Q_c$ of the quality factor, it is apparent that the decrease in the stored energy would be analogous to that defined by relation (9) in which $E'_{em}$ would in that case be strictly zero. Similarly, it is wholly evident that, if the quality factor is restored to its initial value $Q$, the stored energy accordingly increases once again to the value $E_{em}$.

In the method according to the invention, the microwave resonant cavity adopted is of the superconducting type, which makes it possible to obtain a very high unloaded $Q$. The frequency of the electromagnetic wave and consequently of the resonance mode of the cavity is selected without any particular prerequisite condition from the frequency bands usually employed in microwave transmission (L, S and X bands) and preferably from those bands in which there exist generators which continuously deliver very high powers. The resonance modes of the cavity can be those which are usually employed in microwave techniques, in particular the modes which have a high quality factor and in which excitation can readily be performed (for example the $TE_{001}$ or $TM_{101}$ mode). Apart from the fundamental modes, it would be possible to employ high modes excited within cavities of very large size.

Solely by way of explanation and in order to determine the orders of magnitude of the different parameters employed in the method according to the invention, consideration will be given by way of example to a cavity which is excited in the S band in the $TM_{101}$ mode at an angular frequency $\omega = 2 \times 10^{10}$ rad/sec by a microwave generator (of the klystron type, for example) which continuously delivers a power of 500 kW. In the case of a superconducting cavity having a quality factor $Q = 2 \times 10^{10}$, the time constant $\tau$ is equal to 1 second and the stored electromagnetic energy is: $E_{em} = 5 \times 10^5$ joules. In the second step of the method, namely the step which consists in abruptly coupling the cavity with the load to be excited, it is possible to attain loaded quality factors $Q_c$ of the order of $10^2$ to which corresponds a decay constant $\tau' = 10^{-8}$ secs. Although the first charging step lasts a considerable time, it is apparent on the other hand that the duration of the discharging step and consequently of the excitation is extremely short, thereby resulting in a very high dissipated power: $P \simeq 5.10^{13}$ watts. This value is very high and is rarely attained by means of the devices of the prior art; moreover, said value is associated with a quantity of energy which is in turn very large; finally, and as has been indicated earlier, the electromagnetic excitation energy is at a much lower frequency than that of the lasers employed in the prior devices (approximately five orders of magnitude), with the result that the absorption of this electromagnetic energy is possible even during the plasma expansion stage.

Figure 2:
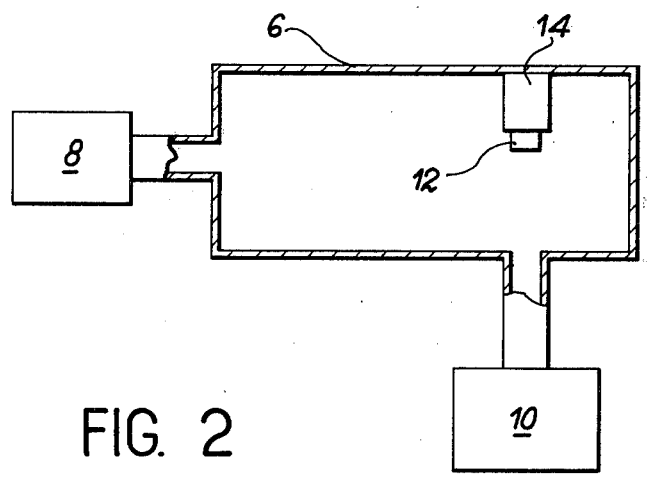
FIG. 2 is a schematic diagram of the device according to the invention.

A further object of the invention is to provide a device which serves to carry out the method described in the foregoing and the principle of which is illustrated in FIG. 2. In this very diagrammatic figure, the reference numeral 6 designates the superconducting structure which is resonant at microwave frequencies and is excited by means 8 for supplying a microwave-frequency electromagnetic field. Said structure 6 contains material 12 on a support 14 and is associated with means 10 for producing pre-ionization of the material 12 from which the plasma is to be obtained.

This device operates as follows: the generator 8 which delivers a power $P_y$ charges the superconducting structure 6 which contains the solid 12 material in a non-ionized form. When the energy stored in the structure 6 is of maximum value, pre-ionization of the material 12 is initiated by the ionization means 10. This produces a considerable reduction in the quality factor of the structure 6 and causes this latter to discharge into the pre-ionized portion of the material 12; the electromagnetic field which is absorbed by the ionized medium heats the plasma and increases its charge density.

In order to achieve optimization of the system, the support 14 will be replaced by a small aperture having the same size as the crystal of deuterium (namely a diameter of approximately 1 mm) through which dropping of the crystal will be initiated at will so that this latter should pass through the geometrical center of symmetry of the cavity at the moment of completion or after completion of charging of the cavity, whereupon said crystal will be ionized by another method. This will accordingly prevent formation of the plasma which is intended to absorb the microwave energy in the proximity of the cavity wall.

Since the plasma excitation power is directly proportional to the power of the generator (formula 10), it is advisable to choose as generator 8 a device which has the highest possible power output. In this connection, it is known that the tubes of the klystron type makes it possible to obtain very high microwave power levels of the order of several hundred kW, especially in the S band. So far as the ionization means 10 are concerned, use can be made of the known means referred-to above, namely intense electron beams and solid-state lasers or gas lasers.

The following description will relate to a few alternative embodiments of the invention and in particular to a device in which ionization is carried out by means of a solid-state lazer but it will naturally be understood that this does not imply any limitation of the invention. So far as concerns the superconducting structure which is designated schematically by the reference 6, it is preferred in practice to separate the zone in which preliminary storage of the electromagnetic energy is effected from the zone in which the plasma is subsequently formed and heated. This leads to a distinction within said structure 6 between a zone formed of one or a number of storage cavities referred-to as reservoir cavities and a zone containing the material from which a plasma is to be obtained, this zone being designated as an experimentation cavity.

Figure 3B:
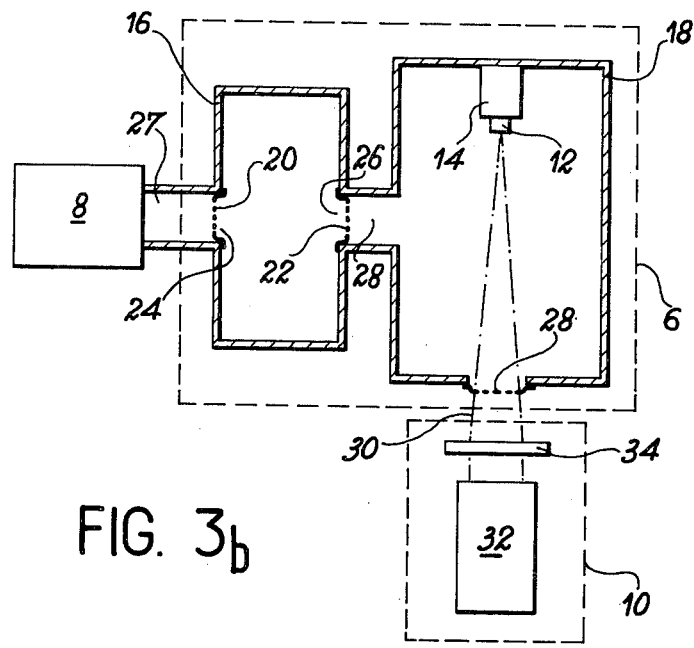
FIG. 3a is a view in elevation showing a device comprising a single storage cavity and an experimentation cavity and FIG. 3b is a part-sectional view of said device, this view being taken along the section plane A.
Figure 3A:
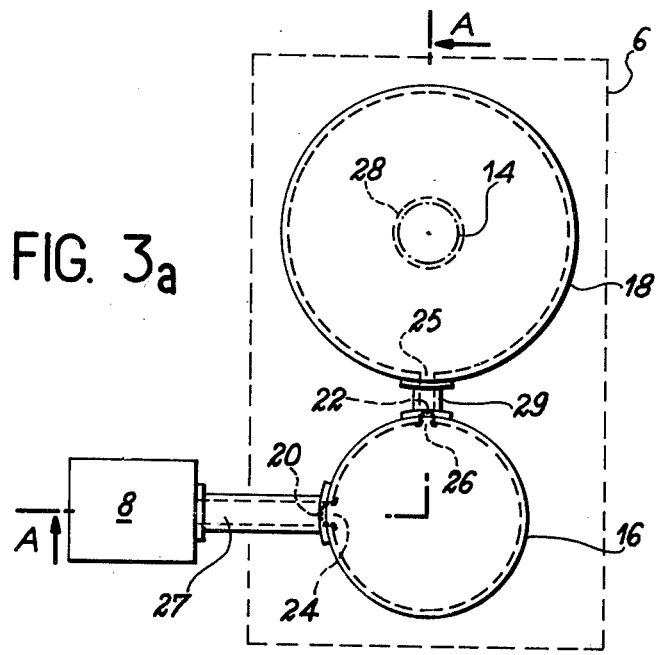

There will now be described in greater detail an alternative embodiment which is shown in FIGS. 3a and 3b and in which use is made of a single storage cavity associated with an experimentation cavity.

FIG. 3a is a view in elevation showing a device in accordance with the invention and FIG. 3b is a sectional view taken along line A—A. The device which is illustrated comprises a microwave generator 8, the design function of which is to excite a storage cavity 16 which then discharges into the experimentation cavity 18. The storage cavity 16 is separated from the generator 8 and from the experimentation cavity 18 by two windows 20 and 22 which are impervious but transparent to microwaves. Coupling between the three elements 8, 16 and 18 is effected in this example by means of irises 24, 25 and 26 and guides 27 and 29 as is well known in microwave techniques. The experimentation cavity 18 contains the material 12 or permits projection of this latter through an aperture onto its support 14. The cavity 18 is provided with an impervious window 28 which is transparent to the pre-ionization 30 (FIG. 3b) emanating from the laser generator 32. The beam 30 is focused by means of an optical system 34 onto the material 12 which serves as a target and can be either supported, released for free fall, projected or even subjected to electrostatic levitation.

In the example which is illustrated, the wave-guides 27 and 29 are in the form of rectangular guides but this does not constitute any limitation of the invention which can also include coaxial lines. Similarly, it is wholly evident that the coupling irises 24, 25 and 26 are described herein solely by way of example and that, depending on requirements, other types of coupling such as inductive loops, for example, can be employed by any one versed in the art.

The separation between the experimentation cavity and the storage cavity serves to create a vacuum within the storage cavity, thereby preventing any breakdown which might otherwise be caused by the very high value of the electric field corresponding to the high level of stored energy (electric field higher than $10^6$ volts per meter). This separation also serves to prevent contamination of the storage cavity by the plasma derived from the material 12. The material 12 can be of any kind according to the plasma which it is desired to obtain and can in particular be a deuterium crystal in the applications which are specifically related to controlled thermonuclear fusion.

The triggering means 10 which, in the case of FIGS. 3a and 3b, are constituted by a laser generator 32 associated with an optical system 34 are of conventional type and can comprise in particular a triggered oscillator which emits a short and intense light pulse. Said pulse is subsequently amplified by a plurality of amplifying stages which serve to increase the energy of the light pulse in order to attain a suitable value on the target 12. It is known that in these applications, the solid-state lasers might make use of neodymium-doped glasses and emit in the near-infrared range are particularly well suited and are consequently employed in some alternative embodiments of the invention. The laser can also be a gas laser of the $CO_2$ type, for example.

The optical system 34 mainly comprises focusing lenses and may include means for modulating the laser pulsation so as to adapt the shape of this latter to the pre-ionization which it is desired to produce at the level of the sample 12.

The cavities 16 and 18 can be of the cylindrical type; this arrangement is not necessary but may nevertheless prove preferable on grounds of ease of construction and machining. Coupling of the cavity 16 with the cavity 18 modifies the resonant frequencies of the cavity 16, with the result that the frequency of the generator 8 must be adjusted to the resonant frequency of the complete circuit.

Figure 4:
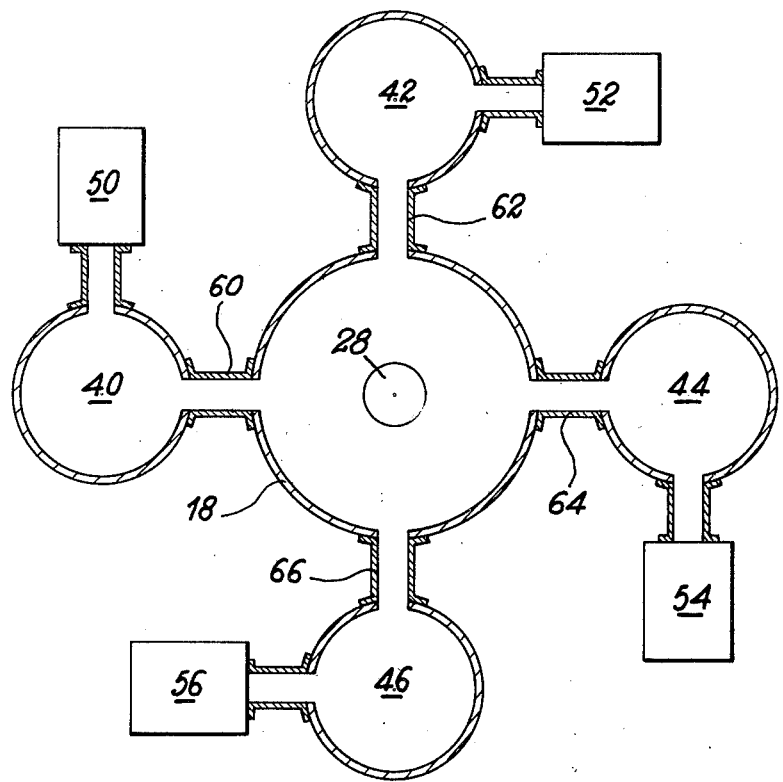
FIG. 4 is a part-sectional view of an alternative embodiment, this view being taken along the mid-plane of the device.

Although the device according to FIGS. 3a and 3b is relatively simple to use, the resultant level of energy storage is lower than that which can be attained in structures containing a plurality of storage cells as is the case with the structure shown in FIG. 4 which constitutes another alternative embodiment of the invention. In this figure, an experimentation cavity 18 is coupled to four storage cavities designated respectively by the references 40, 42, 44 and 46, each cavity being excited by a microwave generator as designated respectively by the references 50, 52, 54 and 56. As can readily be understood, this arrangement has the effect of increasing by a factor of 4 the electromagnetic energy which can be stored. The coupling devices between the storage cavities and the experimentation cavity can be of the same type as those described in connection with FIGS. 3a and 3b, and especially of the iris waveguide type designated by the references 60, 62, 64 and 66. A structure comprising more than four storage cavities spaced around the experimentation cavity could readily be devised.

The different cavities are preferably cylindrical, thereby resulting in structures which are easier to operate in practice than those involving the use, for example, of parallelepipedal cavities in which the quality factors would in any case be lower.

Whereas the device of FIG. 4 is simply deduced from that of FIGS. 3a and 3b as a result of rotation about the axis of the experimentation cavity, it is possible in some alternative embodiments of the invention to assemble the cavities in a different manner. By way of example, one arrangement consists in grouping together in line a plurality of resonant cavities which are coupled to each other and charged by one or a number of generators, the line being coupled to the experimentation structure. In the case of structures of this type, the stored energy increases with the number of resonant cavities employed, with the result that the invention is also directed in one alternative embodiment to structures containing a plurality of lines each constituted by a plurality of resonant cavities, all the lines aforesaid being finally coupled to the experimentation cavity.

Finally, in one particular variant, provision is made in accordance with the invention for a line of resonant reservoir cavities coupled to an experimentation cavity, all these cavities being disposed in spaced relation along a torus so as to form a resonant line which is closed on itself.

In all the devices aforementioned, coupling of the different cavities causes the appearance of a plurality of resonant frequencies. The excitation generators are tuned to one or even a number of these frequencies, the frequency which has the highest quality factor being naturally given preference over the others.

The system can also be used for confinement of the plasma. In fact, the absorption time $\tau_a$ depends on the characteristics of the plasma, that is to say on its temperature and charge density. The time aforesaid is a controllable variable parameter. Two cases are possible: if $\tau_a \geq \tau'$ practically all the energy stored is absorbed (formula 10). If $\tau_a < \tau''$, the electromagnetic energy which has not been absorbed can serve to slow-down the expansion of the heated plasma and has the time to confine as long as the radiation pressure $\frac{1}{2} \epsilon_o E^2 + \frac{1}{2} \mu_o H^2$ is either higher than or equal to the kinetic pressure of the gas. Finally, if the material 12 is not ionized but simply charged electrostatically according to the nature of the microwave structure employed, said material can be subjected to electrostatic levitation or acceleration.

What we claim is:

1. A method for producing and heating a plasma, comprising the steps of:
   locating non-ionized solid material from which the plasma is to be obtained within a superconducting resonant cavity structure;
   storing microwave-frequency electromagnetic energy in said superconducting resonant cavity structure; and then
   pre-ionizing said solid material to create an absorbent load into which the previously-stored electromagnetic energy is discharged to thereby produce said plasma and heat said produced plasma.

2. The method of claim 1 wherein said pre-ionizing step comprises applying a high frequency electric field to said solid material.

3. The method of claim 2, wherein a laser beam is applied to said solid material for pre-ionization thereof.

4. The method of claim 2, wherein an electron beam is applied to said solid material for pre-ionization thereof.

5. The method of claim 1, wherein said superconducting resonant cavity structure comprises a storage cavity and an experimentation cavity coupled thereto, comprising locating said non-ionized solid material in said experimentation cavity and storing microwave-frequency electromagnetic energy in said storage cavity.

6. The method of claim 5, comprising storing said microwave-frequency electromagnetic energy in a plurality of said storage cavities which are coupled with said experimentation cavity.

7. The method of claim 1 comprising locating a non-ionized solid crystal material within said superconducting resonant cavity structure.

8. The method of claim 7 wherein said solid crystal material comprises a deuterium crystal.

* * * * *